United States Patent [19]
Roth

[11] Patent Number: 5,397,104
[45] Date of Patent: Mar. 14, 1995

[54] DROSS COMPRESSION APPARATUS

[75] Inventor: David Roth, Downingtown, Pa.

[73] Assignee: Altek International, Exton, Pa.

[21] Appl. No.: 155,618

[22] Filed: Nov. 22, 1993

[51] Int. Cl.[6] ........................ C22B 7/00; C22B 21/00
[52] U.S. Cl. ...................................... 266/227; 75/672
[58] Field of Search ................. 266/227; 75/414, 672, 75/640, 655

[56] References Cited
U.S. PATENT DOCUMENTS

| | | |
|---|---|---|
| 201,817 | 10/1822 | Rees . |
| 563,769 | 7/1896 | Howard . |
| 2,278,135 | 8/1940 | Osborn . |
| 3,198,505 | 12/1962 | Amdur et al. . |
| 3,517,918 | 12/1967 | Cenkner . |
| 3,999,980 | 12/1976 | Montagna ........................... 75/68 |
| 4,003,559 | 1/1977 | Kuwano et al. .................... 266/204 |
| 4,057,232 | 11/1977 | Ross et al. ......................... 266/227 |
| 4,386,956 | 6/1983 | Roth et al. ............................ 75/24 |
| 4,527,779 | 7/1985 | Roth et al. ......................... 266/227 |
| 4,575,056 | 3/1986 | Julliard et al. ..................... 266/227 |
| 4,637,591 | 1/1987 | McMahon et al. ................. 266/165 |
| 4,772,320 | 9/1988 | van Linden et al. ................. 75/68 |
| 4,948,102 | 8/1990 | Otsuka et al. ...................... 266/205 |

*Primary Examiner*—Melvyn J. Andrews
*Attorney, Agent, or Firm*—Michael F. Petock

[57] ABSTRACT

A dross compression apparatus utilizes a substantially hemispheric shaped receptacle in a dross collector and a complementing compression head which is provided with ribs to form grooves in the material formed between the head and the receptacle. The material formed between the head and the receptacle is substantially a shell comprised of an inner layer of aluminum oxide and outer layers of aluminum. The grooves in the shell enable the material to be more easily processed as the shell is readily broken for crushing. The compression head may be applied more than once to the aluminum dross and may be rotated between applications causing multiple grooves and increased decanting of aluminum. The compression head is provided with a water cooling system which more rapidly cools the aluminum dross and reduces the thermite reaction. The cast steel compression head reduces the air flow to the cooling dross thereby reducing the amount of oxygen available, oxidation and the thermite reaction. The reduction of the thermite reaction in this manner maximizes the amount of aluminum recovered.

10 Claims, 4 Drawing Sheets

5,397,104

DROSS COMPRESSION APPARATUS

FIELD OF THE INVENTION

This invention relates to an improved apparatus and method for the recovery of metal, particularly aluminum, from dross which has been skimmed from a furnace.

BACKGROUND OF THE INVENTION

Aluminum dross is a combination of aluminum metal and aluminum oxides, as well as other possible components such as various oxides, nitrates and carbides. Aluminum dross constitutes a by-product of an aluminum melting operation. Generally, the dross floats on the top of the molten aluminum metal in the furnace. Aluminum dross may contain anywhere from ten (10%) to ninety (90%) percent aluminum depending upon the particular processing technique and the type of furnace. Dross, therefore, in an aluminum melting operation includes a significant amount of aluminum metal which is considered a valuable resource to be recovered. The recovery of aluminum from aluminum dross must also address the problem of the loss of aluminum metal in the dross due to thermiting or thermite reaction, i.e., exothermic oxidation of aluminum metal. It has been estimated that typically two (2%) percent of the aluminum metal is lost for each minute of cooling in at least some prior art systems. The present invention is directed at maximizing the recovery of aluminum from dross, and the present invention may be useful in recovering other non-ferrous metals from other drosses.

Various work has been done in the past on dross recovery systems for aluminum melting including work disclosed in U.S. Pat. Nos. 4,529,779—Roth, et al. and 4,386,956—Roth, et al., of which I am one of the joint inventors named in the foregoing cited patents. In these previous patents, there is some discussion of efforts that have been made prior to the filing dates of the applications which matured into those patents as well as discussion of some of the problems involved in the technology and other prior art dross recovery methods and systems. The teachings of the two foregoing Roth, et al. patents are incorporated herein by reference the same as if set forth at length.

Basically, the Roth, et al. patents disclose a process and apparatus in which compression is applied to aluminum dross placed in a trough receptacle by a wedge shaped compression head.

SUMMARY OF THE INVENTION

Briefly and basically, in accordance with the present invention, a dross compression apparatus is provided which utilizes a dross collector having a substantially hemispheric shaped receptacle and a compression head adapted to cooperate with the receptacle of the dross collector. The compression head is substantially hemispherically shaped to cooperate with the receptacle and is provided with at least one rib on its outer surface to form a groove that at least partially passes through the material formed between the head and the receptacle. In a preferred embodiment, there would be a plurality of equally spaced ribs on the hemispheric head. A preferred embodiment would also include water cooling of the head which reduces the thermiting reaction which commonly occurs in hot aluminum dross. The water cooled head thereby helps maximize the amount of aluminum recovered from the aluminum dross. The close contact of the head with the dross reduces or eliminates the air supply, and accordingly the oxygen supply to the material thereby reducing or eliminating oxidation and the thermite reaction. The ribs on the head enable the material formed between the head and the receptacle to be more easily processed. The material formed between the head of the receptacle when cooled is substantially in the shape of a shell. This shell shape is comprised of outer layers of aluminum with an aluminum oxide core. The grooves formed by the ribs in the shell enable this material to be easily broken to aid in the recovery of the aluminum.

In accordance with the method of the present invention, dross is collected in a receptacle which is substantially hemispherically shaped. Metal is allowed to decant through a passage way (or passage ways) in the lower area of the receptacle and pressure is applied to the dross in the receptacle utilizing a compression head having a substantially hemispheric shape which cooperates with the shape of the receptacle. The compression head is provided with at least one rib on its outer surface to form a groove in the material formed between the head and the receptacle. In a preferred method of operation, the compression head may be programmed to compress, release or rise slightly, index (rotate) and recompress the material to increase the flow of molten aluminum.

In a preferred method of practicing the invention, the head is water cooled to reduce the thermiting action and maximize the amount of aluminum recovered.

BRIEF DESCRIPTION OF THE DRAWINGS

For the purpose of illustrating the invention, there is shown in the drawings forms which are presently preferred; it being understood, however, that this invention is not limited to the precise arrangements and instrumentalities shown.

FIG. 4 is a partially broken away cross-sectional view of one embodiment of a dross collector and a compression head in accordance with the present invention taken along 4—4 of FIG. 3.

DETAILED DESCRIPTION OF THE PREFERRED EMBODIMENTS

Figure 1:
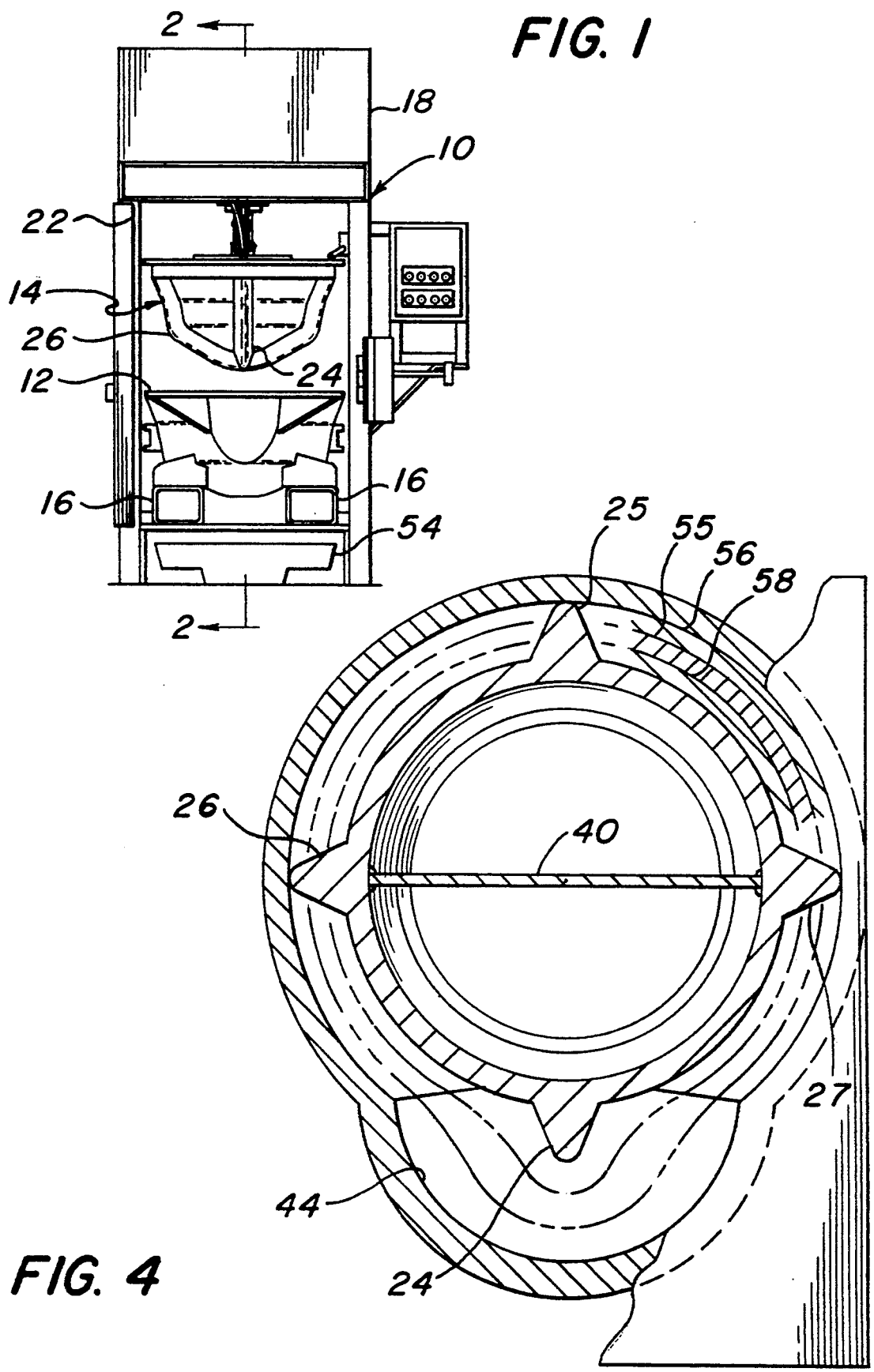
FIG. 1 is an elevation view of a dross compression apparatus in accordance with the present invention.

Referring now to the drawings wherein like numerals indicate like elements, there is shown in FIG. 1 a dross compression apparatus 10 which includes a dross collector 12 and a compression head 14. Dross collector 12 is provided with tubular members 16 which may receive the forks of a forklift truck for transporting the dross collector from the furnace to the dross compression apparatus 10. The dross compression apparatus 10 is housed in a housing 18 which contains a hydraulic drive for operation of compression head 14. However, it is understood that any suitable drive may be utilized including pneumatic, electrical or other drive means. A control panel 20 is provided for controlling the operation of the dross compression apparatus 10 after the door 22 is closed. The hydraulic drive may be best seen in FIGS. 2 and 3 where the hydraulic cylinder 22 may be seen.

As may be seen from all of the figures, compression head 14 is substantially hemispherically shaped. However, as illustrated in the drawings, it is not exactly a hemispheric shape, although it may be. As may be seen in a presently preferred embodiment, the head is made of cast steel having a outwardly projecting lower convex portion 15 and an upper slightly outwardly directed concave portion 17, as may be best seen in FIGS. 2 and 3. Compression head 14 is preferably provided with one or more ribs on its outer surface. The ribs extend from the lowest point of the head and continue on the periphery of the head substantially to the upper edge of the head as may be best seen in FIGS. 1 and 2. The ribs are identified as 24, 25, 26 and 27. It is understood that other arrangements of ribbing may be utilized within the scope of the present invention, including circumferential, but the arrangement as described is the presently preferred embodiment.

Head 14 is provided with a cover plate 28. Cover plate 28 is connected to the head and to piston 30 of hydraulic cylinder 22. Hydraulic cylinder 22 causes piston 30 to be controllably raised and lowered under hydraulic pressure. By control of hydraulic valve of cylinder 22, piston 30 may also be rotated by a predetermined number of degrees causing compression head 14 with its ribs 24 through 27 to also rotate. In a preferred embodiment, the rotation of piston 30 may be forty-five (45) degrees.

In a preferred embodiment, the piston 30 may be caused to be lowered by hydraulic pressure to compress the dross material between head 14 and receptacle 42. After applying a predetermined amount of compression, head 14 may be raised slightly to clear the dross and rotated or indexed by a predetermined number of degrees, preferably forty-five (45) degrees and then again lowered under hydraulic pressure to compress the dross.

Figure 2:
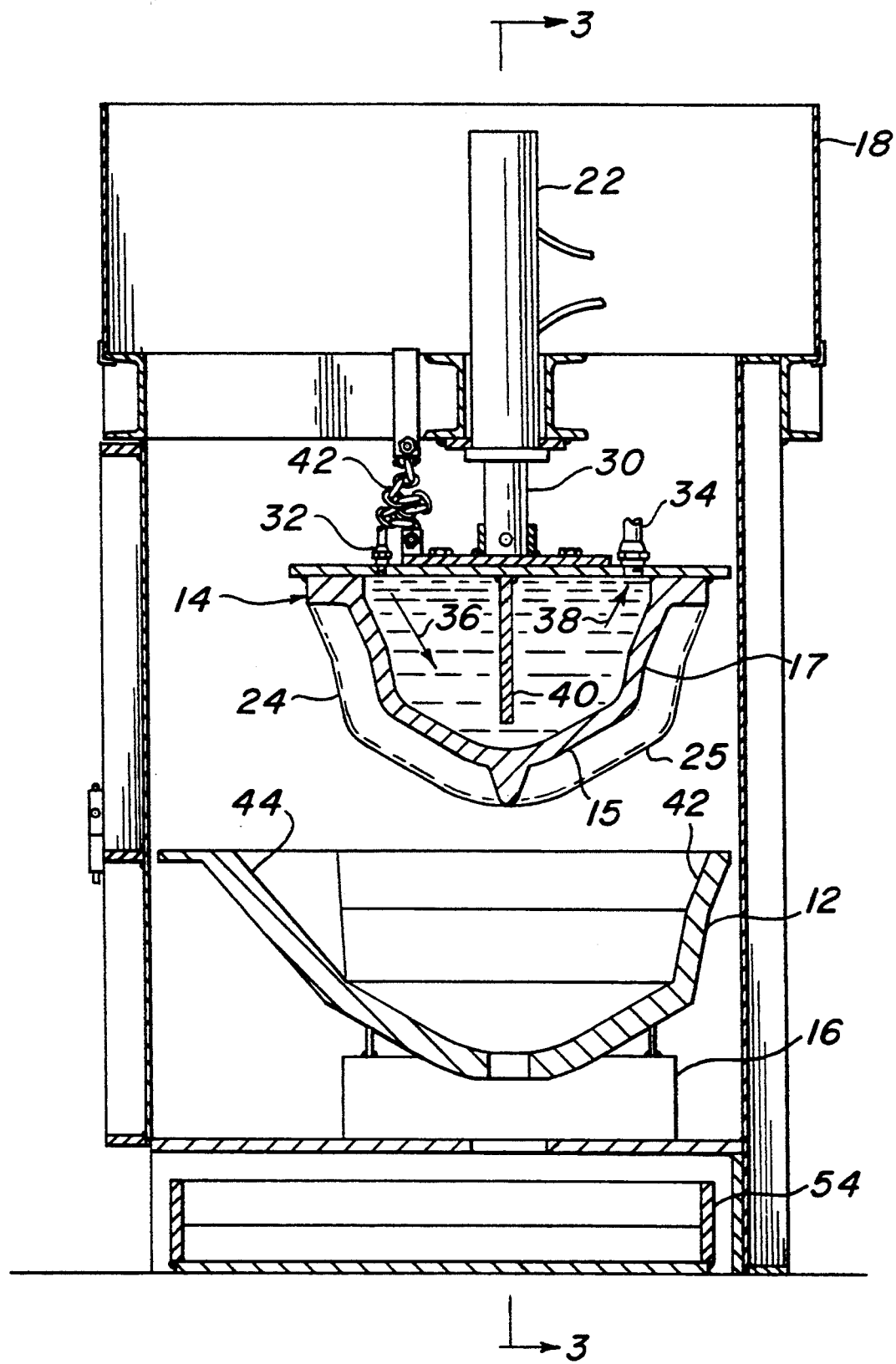
FIG. 2 is a cross-sectional view taken along line 2—2 of FIG. 1.

Head 14 is preferably constructed of cast steel in one piece. This provides advantages, particularly in cooling of the aluminum dross. Optionally, head 14 may be water cooled. As illustrated in an optional, but preferred embodiment, cover plate 28 is provided with a water inlet 32 and a water outlet 34. Preferably, water outlet 34 is of somewhat larger diameter than inlet 32 as some steam may be generated during the cooling process. As illustrated in FIG. 2, the water flow may be in the direction of arrows 36 and 38 around baffle 40 to maximize water flow adjacent the outer surfaces of head 14.

Head 14 with its cover plate 28 is provided with a safety or stop chain 42 which limits the downward movement of head 14.

Figure 5:
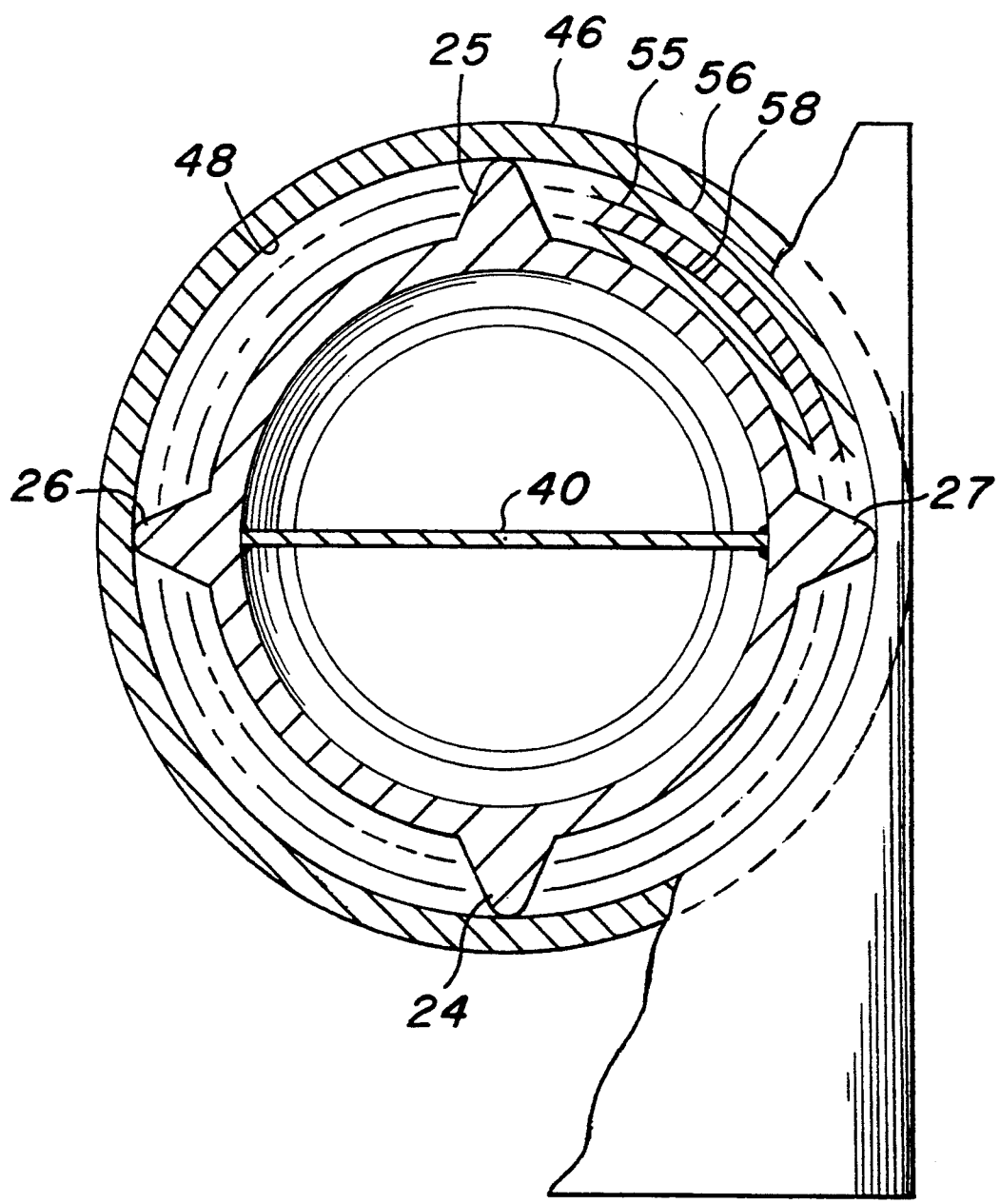
FIG. 5 is a partially broken away cross-sectional view of a preferred embodiment of a dross collector and a compression head in accordance with the present invention which would correspond to the view taken along line 4—4 of FIG. 3.

Collector 12, which may be referred to in this industry as a skim box, includes a substantially hemispheric shaped receptacle 42. As illustrated in FIG. 2 and 4, the receptacle 42 may have a deviation such as the one shown at 44 for purposes of pouring, particularly where the skim box may be utilized in more than one process. Preferably, the receptacle in the dross collector or skim box is also substantially hemispherically shaped as illustrated in FIG. 5 wherein the collector or skim box 46 is provided with a receptacle 48 which is round in plan view at the level of cross-section 4—4.

The receptacles 42 or 48 of dross collectors 12 and 46, respectively, are provided with an opening 50 near their lower ends. Preferably, the opening 50 would be directly at the bottom of the receptacle. However, the opening 50 may be located at other locations in the lower portions of the collectors and more than one opening may be utilized. Opening 50 allows molten aluminum to pass by gravity and under the pressure of compression head 14 out from the collector through opening 50 in the collector, opening 52 in the cabinet and into to a lower receptacle which is referred to in the art as a sow mold 54.

In operation in accordance with the method of the present invention, dross is collected from an electric furnace or the like in receptacle 42 or 48 of the dross collector. The dross collector or skim box 12 or 46 is transported to the dross compression apparatus 10, and with the sow mold 54 in place, metal, particularly aluminum, is allowed to decant through opening 50 in the lower end of the dross collector, through opening 52 into the sow mold. The dross is then compressed applying pressure by compression head 14 which has a substantially hemispheric shape which cooperates with the shape of the receptacle. The compression head with the ribs thereon forms grooves in the material being cooled between compression head 14 and the inside of the receptacle of the dross collector.

In accordance with the preferred embodiment, as described particularly with respect to FIG. 2, preferably compression head 14 is provided with a continuous flow of cooling water to produce rapid cooling of the dross and thereby minimize the thermiting effect. The compression head being in contact with the cooling dross eliminates or reduces the supply of air, and accordingly reduces the supply of oxygen, to the material which thereby reduces the thermite reaction. As mentioned above, the thermite reaction is exothermic oxidation of aluminum metal, and the amount of such oxidation can be minimized by rapid cooling and decreasing the amount of oxygen available. The thermite reaction is a thermal reaction which consumes aluminum, and therefore must be minimized to maximize the amount of aluminum recovered.

Figure 3:
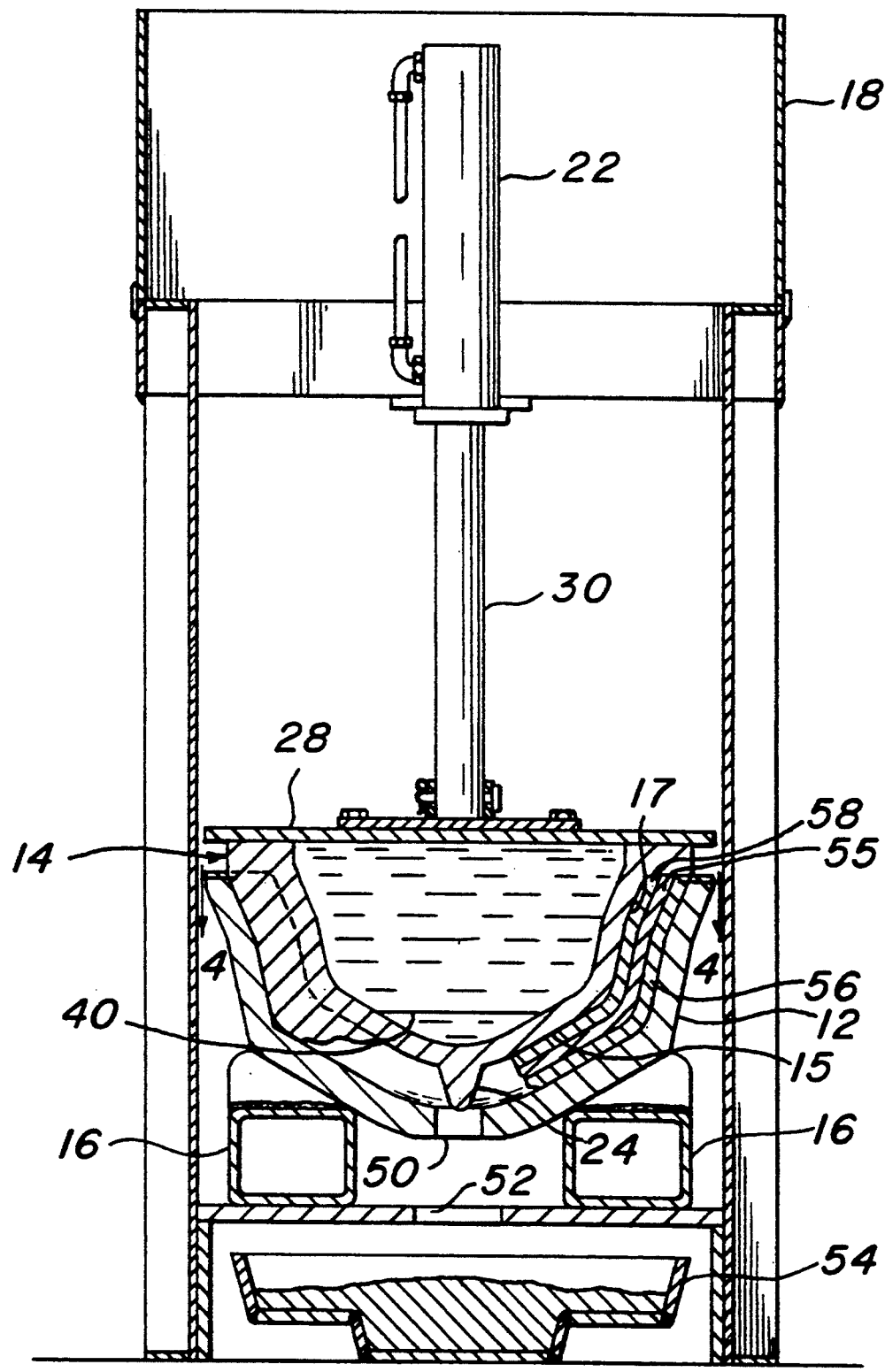
FIG. 3 is a cross-sectional view taken along line 3—3 of FIG. 2.

The grooving of the material formed between the compression head and the inside of the receptacle is illustrated in FIGS. 3, 4 and 5. The material that forms between compression head 14 and the inner surface of the receptacle is basically a hemispheric shell comprised of aluminum oxide 55 with outer layers of aluminum 56 and 58. Ribs 24 through 27 form grooves in this hemispheric shell of material enabling the shell to be easily broken for further processing, such as by crushing.

In a preferred method of practicing the present invention, compression head 14 is caused by hydraulic cylinder 22 and piston 30 to compress the dross in receptacle 42, causing flow of aluminum through opening or hole 50 in the lower end of receptacle 42 as well as a set of four grooves caused by ribs 24 through 27. Cylinder 22 is then caused by hydraulic controls well known in the art, to raise piston 30 thereby raising head 14 slightly out of contact with the dross. The piston 30 is then rotated by the application of hydraulic pressure, by methods well known in the art, and compression head 14 is then again pressed against the dross a second time thereby maximizing the flow of aluminum through opening 50 and causing a second set of four grooves in the shell of material formed between compression head 14 and receptacle 42. In a preferred embodiment, head 14 is rotated forty-five (45) degrees, thereby resulting, after the second compression, in a shell having eight grooves spaced approximately forty-five (45) degrees apart. However, it is understood that more than two iterations of this process may be carried out resulting in more than eight grooves and that various other amounts of rotation may be selected within the scope of the present invention.

The receptacle of the collector may be preferably shaped to closely approximate the shape of the head, however, deviations in the shape of the receptacle in the collector do not significantly interfere with this result as the grooves formed in the shell of aluminum and aluminum oxide enable the shell to be more easily broken to facilitate the further processing steps in the recovery of the maximum amount of aluminum.

In view of the above, the present invention may be embodied in other specific forms without departing from the spirit or essential attributes thereof and, accordingly, reference should be made to the appended claims, rather than to the foregoing specification as indicating the scope of the invention.

I claim:

1. A dross compression apparatus, comprising:
a dross collector, said collector including a substantially hemispheric shaped receptacle; and
a compression head adapted to cooperate with said receptacle of said dross collector, said head being of a substantially hemispheric shape and provided with at least one rib on an outer surface of said hemispheric shaped head to form a groove in the material formed between said head and said receptacle.

2. A dross compression apparatus in accordance with claim 1, wherein said head is provided with a water flow path for cooling.

3. A dross compression apparatus in accordance with claim 2, wherein said head is provided with a substantially closed top having an opening for the entry of cooling water and an exit for said water, thereby enabling the continuous flow of cooling water through said head.

4. A dross compression apparatus in accordance with claim 1, wherein said head is provided with a plurality of ribs on the outer surface of said hemispheric shaped head, said ribs extending from lowest point of said head and continuing along the periphery of the head substantially to the upper end of the head.

5. A dross compression apparatus in accordance with claim 4, wherein said plurality of ribs are equally spaced on the outer surface of said head.

6. A dross compression apparatus in accordance with claim 1, wherein said dross compression apparatus includes a drive for said compression head, said drive including means for rotating said compression head.

7. A dross compression apparatus in accordance with claim 6, wherein said drive causes said compression head to compress said material, release, rotate by a number of degrees and compress said material a second time.

8. A drive in accordance with claim 7, wherein said number of degrees of rotation is approximately forty-five (45) degrees.

9. A dross compression apparatus in accordance with claim 1, wherein said receptacle of said dross collector is provided with at least one opening near a lower end of the receptacle.

10. A dross compression apparatus in accordance with claim 1, wherein said head is constructed of cast steel.

* * * * *